United States Patent
Luo et al.

(10) Patent No.: US 10,470,264 B1
(45) Date of Patent: Nov. 5, 2019

(54) SMART COMMUNICATION INTERFACE FOR LED MATRIX CONTROL

(71) Applicant: Monolithic Power Systems, Inc., San Jose, CA (US)

(72) Inventors: Zheng Luo, San Jose, CA (US); Junjian Zhao, San Jose, CA (US); Chao Liu, Sunnyvale, CA (US); Tong Chen, San Jose, CA (US); Yu-Huei Lee, New Taipei (TW)

(73) Assignee: Monolithic Power Systems, Inc., San Jose, CA (US)

( * ) Notice: Subject to any disclaimer, the term of this patent is extended or adjusted under 35 U.S.C. 154(b) by 0 days.

(21) Appl. No.: 16/112,575

(22) Filed: Aug. 24, 2018

(51) Int. Cl.
*H05B 33/08* (2006.01)
*G06F 11/10* (2006.01)
*H05B 37/02* (2006.01)

(52) U.S. Cl.
CPC ..... *H05B 33/0845* (2013.01); *G06F 11/1004* (2013.01); *H05B 37/0254* (2013.01)

(58) Field of Classification Search
CPC ............ H05B 33/0845; H05B 37/0254; G06F 11/1004
USPC ........................................................ 315/297
See application file for complete search history.

(56) References Cited

U.S. PATENT DOCUMENTS

| | | | |
|---|---|---|---|
| 2009/0225014 A1* | 9/2009 | Ikegami | G09G 3/02 345/82 |
| 2012/0323394 A1* | 12/2012 | Gandhi | H05B 33/0857 700/297 |
| 2017/0220515 A1* | 8/2017 | Lin | G06F 1/3287 |
| 2018/0075798 A1* | 3/2018 | Nho | G09G 3/32 |
| 2018/0128493 A1* | 5/2018 | Chen | H05B 3/746 |
| 2018/0247598 A1* | 8/2018 | Sainis | G09G 3/344 |

\* cited by examiner

*Primary Examiner* — Don P Le
(74) *Attorney, Agent, or Firm* — Perkins Coie LLP

(57) ABSTRACT

A smart communication interface for a LED driving system driving a LED matrix having a plurality of LEDs. The smart communication interface may have a data write transaction structure in write mode. The data write transaction structure includes an address code for identifying a corresponding one LED among the plurality of LEDs; an R/W indicating code for indicating whether the smart communication interface is in write mode; and a grayscale command code for indicating a programmed grayscale command value for the corresponding one LED identified by the address code. The smart communication interface may include a data read transaction structure in read mode. The data read transaction structure includes the address code, the R/W indicating code and a grayscale read-back code for indicating a grayscale command value for the corresponding one LED identified by the address code.

18 Claims, 10 Drawing Sheets

SMART COMMUNICATION INTERFACE FOR LED MATRIX CONTROL

TECHNICAL FIELD

This disclosure relates generally to light emitting diode ("LED") driving, and more particularly but not exclusively relates to communication interface for controlling the driving of LED matrix.

BACKGROUND

Large matrix of high-brightness light emitting diodes ("LEDs") is more and more popular in applications such as large light sources matrix, high brightness LED matrix displays and automotive LED headlight systems etc. Fast and efficient driving control to such LED matrix with smart brightness adjusting is desired.

SUMMARY

In accomplishing the above and other objects, there has been provided, in accordance with an embodiment of the present disclosure, a smart communication interface for a LED driving system driving a LED matrix having a plurality of LEDs. The smart communication interface may comprise a data write transaction structure in write mode. The data write transaction structure may comprise an address code for identifying a corresponding one LED among the plurality of LEDs, an R/W indicating code for indicating whether the smart communication interface is in write mode, and a grayscale command code for indicating a programmed grayscale command value for the corresponding one LED identified by the address code.

The smart communication interface may have a clock differential pin pair configured to receive a system clock signal from a master controller, wherein the system clock signal has a first type transition edge and a second type transition edge opposite to the first type transition edge during each clock cycle; and a data receive differential pin pair configured to sample each bit of code of the data write transaction structure at the second type transition edge of each clock cycle, wherein each corresponding bit of code of the data write transaction structure is driven out by the master controller at the first type transition edge of each clock cycle.

The data write transaction structure may further comprise a parity code for indicating the correctness of parity of the data write code block; and an acknowledge code for indicating whether the smart communication interface acknowledges the data write code block. The data write transaction structure may further comprise a turnaround code immediately following the parity code.

The smart communication interface may further have a data return differential pin pair configured to issue the acknowledge code at the first type transition edge of a clock cycle of the system clock signal which is one clock cycle after the clock cycle during which the parity code was issued by the master controller. The master controller may be configured to sample the acknowledge code at the second type transition edge of the system clock signal which is immediately following the first type transition edge of the system clock signal at which the acknowledge code ACK was issued.

Completion of transaction of all bits of code of the data write transaction structure defines one write data frame. The master controller may be configured to start driving out each bit of code of the data write transaction structure of a next write data frame at the first type transition edge of a clock cycle of the system clock signal which is immediately following the clock cycle during which the master controller has received the acknowledge code of the current write data frame.

The master controller may also be configured to stop the system clock signal for a predetermined write-stop duration to reset all bits of code of the data write transaction structure, and to resume the driving out of the system clock signal and start to drive out each bit of code of the data write transaction structure of a new write data frame after the predetermined write-stop duration.

The smart communication interface may be able to operate in a portion write mode. In the portion write mode, the master controller is configured to consecutively drive out the grayscale command code for each one LED of a portion of LEDs having consecutive address codes in the LED matrix, wherein the portion of LEDs starts from a starting LED with an initial address code and ends with an ending LED with an ending address code. Correspondingly, the smart communication interface is configured to increase the address code of the current write data frame by 1 starting from the initial address code until the ending address code is reached, and further configured to automatically send the grayscale command code of the next write data frame to the LED identified by the address code of the current data write frame increased by 1.

There has also been provided, in accordance with an embodiment of the present disclosure, a smart communication interface for a LED driving system driving a LED matrix having a plurality of LEDs. The smart communication interface may comprise a data read transaction structure in read mode. The data read transaction structure may comprise: an address code for identifying a corresponding one LED among the plurality of LEDs, an R/W indicating code for indicating whether the smart communication interface is in read mode, and a grayscale read-back code for indicating a grayscale command value for the corresponding one LED identified by the address code.

The smart communication interface may have a clock differential pin pair configured to receive a system clock signal from a master controller, wherein the system clock signal has a first type transition edge and a second type transition edge opposite to the first type transition edge during each clock cycle; and a data receive differential pin pair configured to sample each bit of code of the data read transaction structure at the second type transition edge of each clock cycle, wherein each corresponding bit of code of the data read transaction structure is driven out by the master controller at the first type transition edge of each clock cycle.

The data read transaction structure may further comprise: a parity code for indicating the correctness of parity of the address code and the R/W indicating code; and an acknowledge code for indicating whether the smart communication interface acknowledges the address code. The data read transaction structure may further comprise a turnaround code immediately following the parity code.

The smart communication interface may further have a data return differential pin pair configured to issue the acknowledge code at the first type transition edge of a clock cycle of the system clock signal which is one clock cycle after the clock cycle during which the parity code was issued by the master controller. The master controller may be configured to sample the acknowledge code at the second type transition edge of the system clock signal which is immediately following the first type transition edge of the system clock signal at which the acknowledge code ACK was issued.

The data read transaction structure may further comprise a frame fill code, and the smart communication interface may be configured to start issuing each bit of the frame fill code at the first type transition edge of each clock cycle of the system clock signal immediately following the clock cycle during which the acknowledge code was issued.

The smart communication interface of may further be configured to start issuing each bit of the grayscale readback code on the data return differential pin pair at the first type transition edge of each clock cycle of the system clock signal which is immediately following the clock cycle during which the issuance of the frame fill code has been completed.

Completion of transaction of all bits of code of the data read transaction structure defines one read data frame. The master controller may be configured to start driving out each bit of code of the data read transaction structure of a next read data frame at the first type transition edge of the system clock signal which is immediately following the first type transition edge at which the smart communication interface has issued the last bit of the frame fill code in the current read data frame.

The master controller may also be configured to stop the system clock signal for a predetermined read-stop duration to reset all bits of code of the data read transaction structure, and to resume the driving out of the system clock signal and start to drive out each bit of code of the data read transaction structure of a new read data frame after the predetermined read-stop duration.

BRIEF DESCRIPTION OF THE DRAWINGS

The following detailed description of various embodiments of the present invention can best be understood when read in conjunction with the following drawings, in which the features are not necessarily drawn to scale but rather are drawn as to best illustrate the pertinent features.

DETAILED DESCRIPTION

Various embodiments of the present invention will now be described. In the following description, some specific details, such as example circuits and example values for these circuit components, are included to provide a thorough understanding of embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

Throughout the specification and claims, the term "coupled," as used herein, is defined as directly or indirectly connected in an electrical or non-electrical manner. The terms "a," "an," and "the" include plural reference, and the term "in" includes "in" and "on". The phrase "in one embodiment," as used herein does not necessarily refer to the same embodiment, although it may. The term "or" is an inclusive "or" operator, and is equivalent to the term "and/or" herein, unless the context clearly dictates otherwise. The term "based on" is not exclusive and allows for being based on additional factors not described, unless the context clearly dictates otherwise. The term "circuit" means at least either a single component or a multiplicity of components, either active and/or passive, that are coupled together to provide a desired function. The term "signal" means at least one current, voltage, charge, temperature, data, or other signal. Those skilled in the art should understand that the meanings of the terms identified above do not necessarily limit the terms, but merely provide illustrative examples for the terms.

Figure 1:
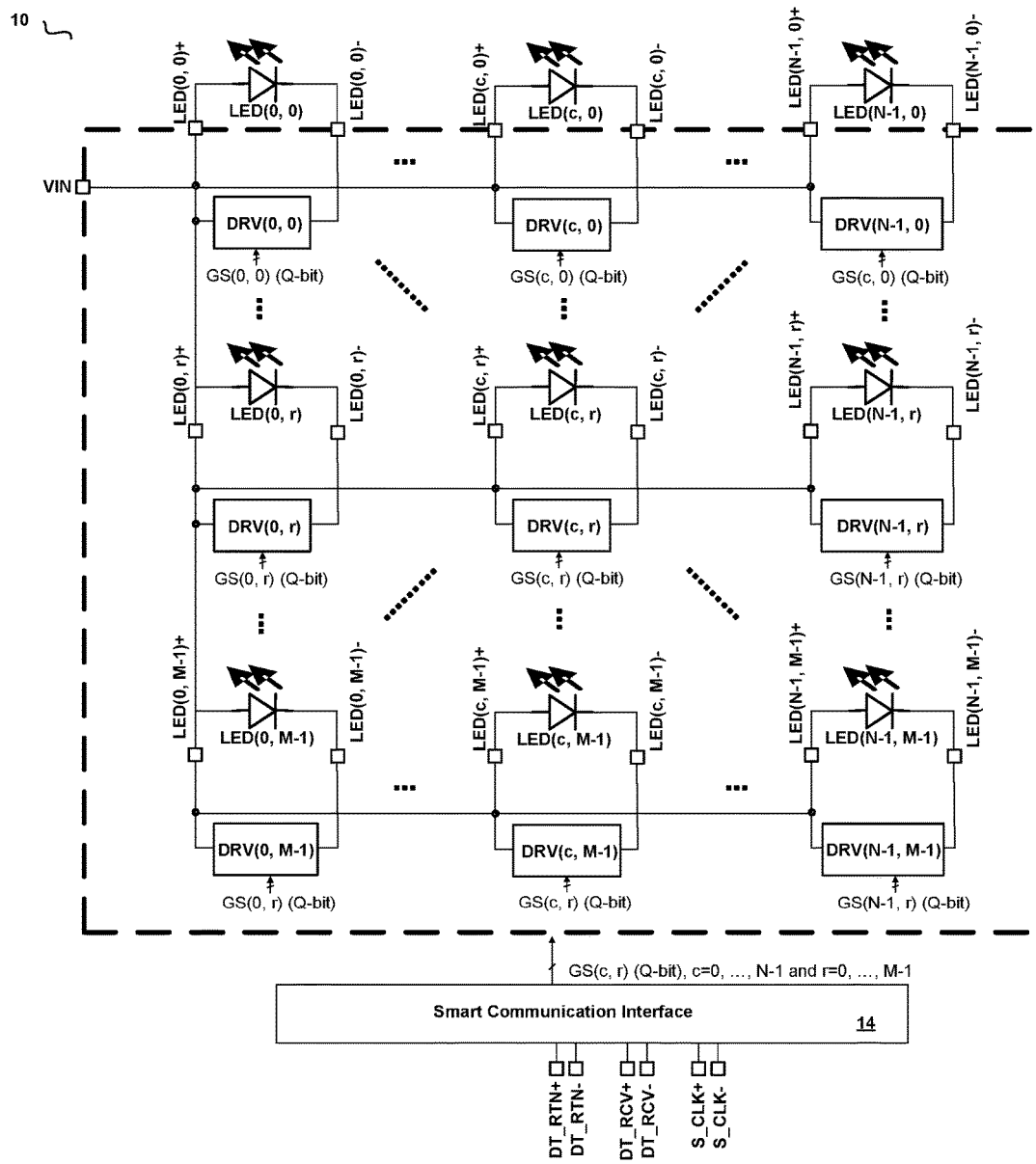
FIG. 1 illustrates a block diagram of a LED matrix driving system 10 in accordance with an embodiment of the present invention.

FIG. 1 illustrates a block diagram of a LED matrix driving system 10 in accordance with an embodiment of the present invention. The LED matrix driving system 10 is provided to drive a LED matrix including a plurality of LEDs connected in parallel and arranged in a LED matrix of M rows and N columns, expressed by {LED(c, r), c=0, 1, . . . , N−1, r=0, 1, . . . , M−1}, wherein M and N are integers greater than 1. Each one LED, e.g. the LED(c, r) in the cth column and rth row in the LED matrix may be connected between a LED positive port LED(c, r)+ and a LED negative port LED(c, r)−, wherein c is an integer ranging from 0 to N−1, and r is an integer ranging from 0 to M−1. The LED matrix driving system 10 may comprise a corresponding plurality of driving modules, wherein each one of the corresponding plurality of driving modules is configured to drive a corresponding one of the plurality of LEDs and to adjust the brightness/flux of the corresponding one LED using Q-bit grayscale command ("GS"), wherein Q is an integer greater than 0.

That is to say, for the LED matrix of M rows and N columns, the LED matrix driving system 10 may comprise M by N (i.e. M*N) driving modules, expressed by {DRV(c, r), c=0, 1, . . . , N−1, r=0, 1, . . . , M−1}. For each c=0, 1, . . . , N−1 and r=0, 1, . . . , M−1, each one of the M*N driving modules, e.g. the driving module DRV(c, r), is configured to drive the corresponding one LED(c, r) and to adjust the brightness/flux of the corresponding one LED(c, r) using Q-bit grayscale command comprising Q bits. In this manner, for each one LED(c, r) in the LED matrix, the Q-bit grayscale command can provide 2Q grayscale adjusting steps, respectively indicative of 0% to 100% brightness of the LED(c, r). For instance, for the LED(c, r) in the cth column and rth row, the adjusted brightness in percentage may be expressed by the following equation (1):

$$\text{Brightness of LED}(c,r) \text{ in percentage} = GS(c,r)/2Q*100\% \quad (1)$$

In the above equation (1), the parameter GS(c, r) is a programmed grayscale command value for the LED(c, r) provided to the corresponding one LED driving module DRV(c, r) for the LED(c, r). The programmed grayscale command value GS(c, r) may range from 0 to 2Q. Therefore, the brightness of the LED(c, r) in the cth column and rth row may be determined by a ratio of the programmed grayscale command value GS(c, r) for the LED(c, r) to 2Q.

In accordance with an embodiment of the present invention, still referring to FIG. 1, the LED matrix driving system 10 may further comprise a smart communication interface 14. The smart communication interface 14 may have a clock differential pin pair (S_CLK+, S_CLK−), a data receive differential pin pair (DT_RCV+, DT_RCV−) and a data return differential pin pair (DT_RTN+, DT_RTN−). The smart communication interface 14 may be configured to stream data exchange between a master controller (e.g. a microcontroller, a central processing unit etc.) and the LED matrix driving system 10.

Figure 2:
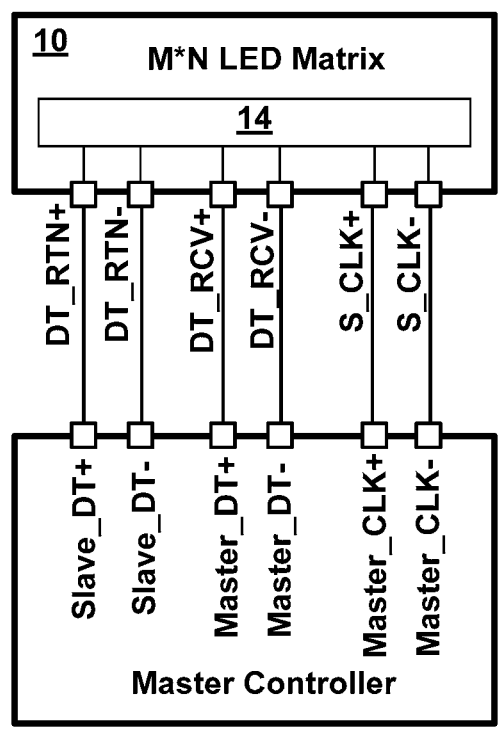
FIG. 2 illustrates a block diagram showing a LED matrix driving system 10 coupled to a master controller in accordance with an embodiment of the present invention.

FIG. 2 illustrates a block diagram showing a LED matrix driving system 10 coupled to a master controller in accordance with an embodiment of the present invention. The clock differential pin pair (S_CLK+, S_CLK−) may be coupled to a master clock pin pair (Master_CLK+, Master_CLK−) of the master controller through a clock signal bus pair and may be configured to receive a system clock signal S_CLK from the master controller. The system clock signal S_CLK may synchronize the data read and write between the master controller and the LED matrix driving system 10 clock cycle by clock cycle. The system clock signal S_CLK may have a first type transition edge (e.g. a falling edge) and a second type transition edge (e.g. a rising edge) opposite to the first type transition edge in each clock cycle. One of ordinary skill in the art would understand that in alternative examples, the first type transition edge could be a rising edge while the second type transition edge could be a falling edge. The data receive differential pin pair (DT_RCV+, DT_RCV−) may be coupled to a master data driving pin pair (Master_DT+, Master_DT−) of the master controller through a data receive bus pair and may be configured to read in programmed data such as the programmed grayscale command value GS(c, r) for each LED in the LED matrix from the master controller. The data return differential pin pair(DT_RTN+, DT_RTN−) may be coupled to a master data receive pin pair (Slave_DT+, Slave_DT−) of the master controller through a data return bus pair and may be configured to send feedback data from the LED matrix driving system 10 to the master controller.

In accordance with an embodiment of the present invention, each one of the plurality of driving modules DRV(c, r) (for each c=0, ..., N−1, r=0, ..., M−1) may have a unique preset address code composed of J-bit column address code and K-bit row address code, wherein J is an integer greater than 1 and depending on the number (i.e. N) of columns of the LED matrix, and wherein K is an integer greater than 1 and depending on the number (i.e. M) of rows of the LED matrix. The integer J should satisfy the expression of 2J≥N while the integer K should satisfy the expression of 2K≥M. For this situation, it can be considered that for each c=0, 1, ..., N−1 and r=0, 1, ..., M−1, each one of the plurality of LEDs, e.g. the LED(c, r) driven by the corresponding one driving module DRV(c, r), has an address code composed of J-bit column address code and K-bit row address code, through which the LED(c, r) can be identified. For instance, in the example where the LED matrix is of 28 rows and 44 columns (i.e. M=28, N=44), the LED(c, r) for each c=0, ..., 43, r=0, ..., 27 may have an address code composed of 6-bit column address code (i.e. J=6) and 5-bit row address code (i.e. K=5).

The smart communication interface 14 may be configured to write the programmed grayscale command value GS(c, r) into the driving model DRV(c, r) for driving the corresponding one LED(c, r) by identifying the unique preset address code of the driving module DRV(c, r), for each c=0, ..., N−1, r=0, ..., M−1.

In accordance with an embodiment of the present invention, the master controller may provide and drive out the system clock signal S_CLK on the master clock pin pair (Master_CLK+, Master_CLK−). The smart communication interface 14 is in default reset (i.e. each bit of data is logic "0") on the data receive differential pin pair (DT_RCV+, DT_RCV−) and the data return differential pin pair (DT_RTN+, DT_RTN−). Once the system clock signal S_CLK on the master clock pin pair (Master_CLK+, Master_CLK−) starts to toggle, the smart communication interface 14 enters into listening state by detecting a first type transition edge (e.g. a falling edge) of the system clock signal S_CLK.

Figure 3:
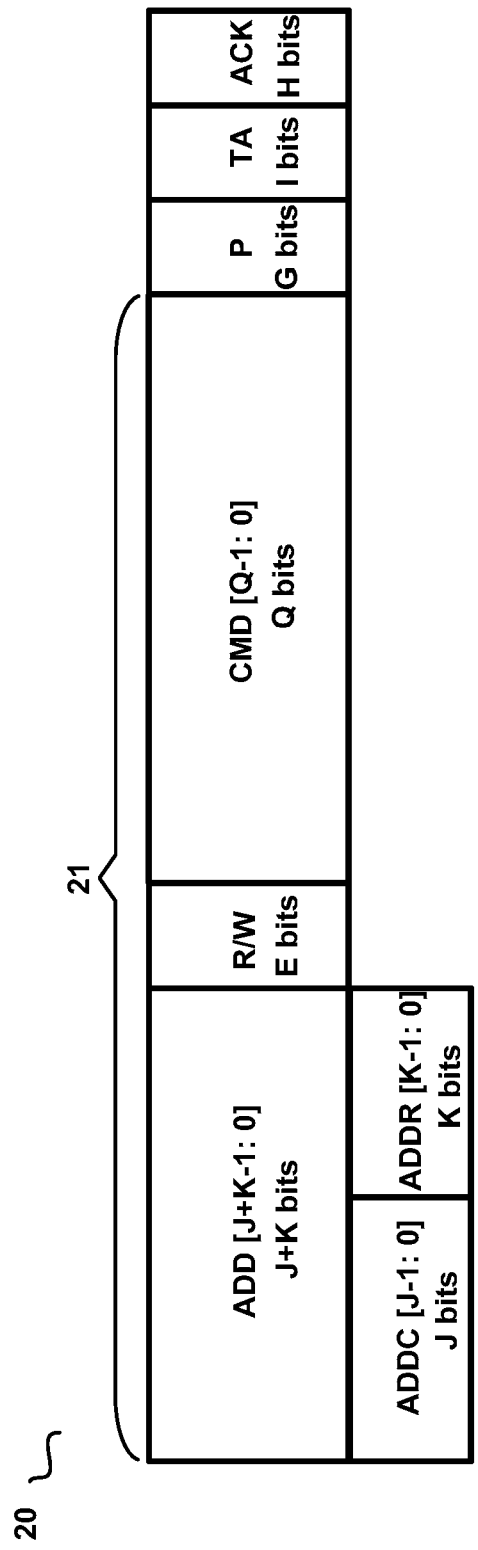
FIG. 3 illustrates an exemplary data write transaction structure 20 of a smart communication interface for the LED matrix driving system 10 when communicating with the master controller in write mode in accordance with an embodiment of the present invention.

In accordance with an embodiment of the present invention, the smart communication interface 14 may have a data write transaction structure 20 when communicating with the master controller in write mode as illustrated in FIG. 3. The data write transaction structure 20 may comprise an address code ADD having a column address code ADDC of J bits (J-bit column address code) and a row address code ADDR of K bits (K-bit row address code), an R/W indicating code of E bits (E-bit R/W indicating code), and a grayscale command code CMD of Q bits (Q-bit grayscale command code). E is a positive integer. The address code ADD is used to identify the unique preset address code of the local Q-bit grayscale command register GSR(c, r) for the corresponding one LED(c, r), for each c=0, ..., N−1, r=0, ..., M−1. The R/W indicating code is used to indicate whether the smart communication interface 14 (or the LED matrix driving system 10) is in read mode or in write mode. In an embodiment, when the R/W indicating code is logic "1", it indicates the read mode (the smart communication interface 14 is in read mode), when the R/W indicating code is logic "0", it indicates the write mode (the smart communication interface 14 is in read mode). The grayscale command code CMD indicates the programmed grayscale command value GS(c, r) provided to the driving module DRV(c, r) for the LED(c, r) identified by the address code ADD.

Figure 4:
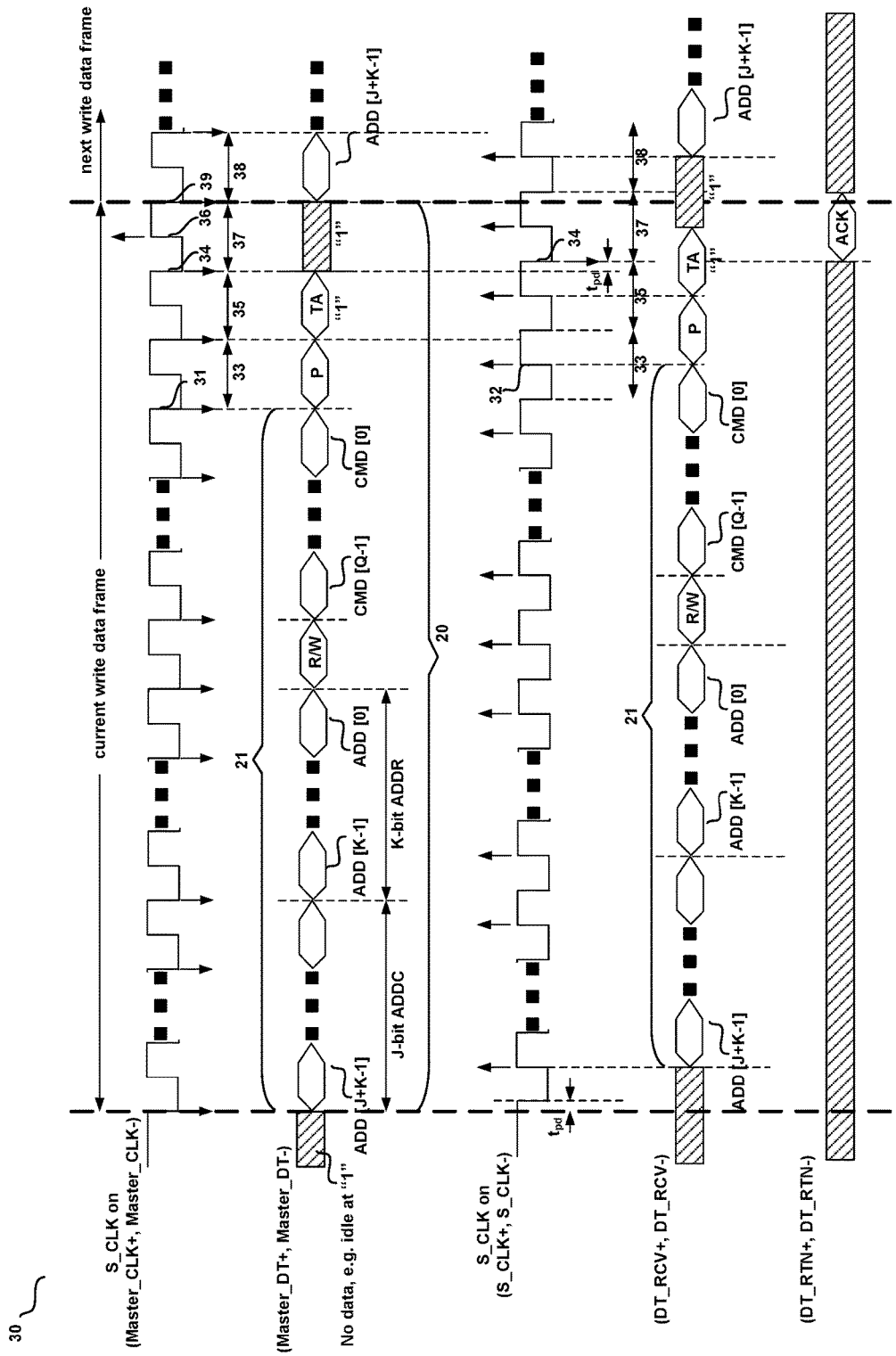
FIG. 4 illustrates an exemplary code transaction timing diagram 30 in write mode in accordance with an embodiment of the present invention.

In accordance with an embodiment of the present invention, as shown in FIG. 4, an exemplary code transaction timing diagram 30 in write mode is illustrated. The master controller may drive out each bit of code of the data write transaction structure 20 on the master data driving pin pair (Master_DT+, Master_DT−) at the first type transition edge (e.g. falling edge) of each clock cycle of the system clock signal S_CLK. The smart communication interface 14 may sample each corresponding bit of code of the data write transaction structure 20 transmitted to the data receive differential pin pair (DT_RCV+, DT_RCV−) at the second type transition edge (e.g. rising edge) of each clock cycle of the system clock signal S_CLK. Completion of transaction of all bits of code of the data write transaction structure 20 may be referred to as one write data frame. The master controller driving out each bit of code at the first type transition edge of each clock cycle of the system clock signal S_CLK while the smart communication interface 14 sampling each corresponding bit of code at the second type transition edge of each clock cycle of the system clock signal S_CLK can minimize/eliminate error occurrence during each bit of code transaction due to propagating delay on the clock signal bus pair, the data receive bus pair and the data return bus pair. As shown in FIG. 4, a propagating delay tpd is illustrated out between the system clock signal S_CLK driven out on the master clock pin pair (Master_CLK+, Master_CLK−) by the master controller and the system clock signal S_CLK received on the clock differential pin pair (S_CLK+, S_CLK−) by the smart communication interface 14.

In accordance with an embodiment of the present invention, the address code ADD, the R/W indicating code and the grayscale command code CMD of the data write transaction structure 20 may be considered as a data write code block 21 having a code length of (J+K+E+Q) bits. The smart communication interface 14 may verify the correctness of parity of the data write code block 21 (comprising the J-bit column address code, the K-bit row address code, the E-bit R/W indicating code, and the Q-bit grayscale command code). If either the parity is wrong or the code length of the data write code block 21 is incorrect (not (J+K+E+Q) bits), the smart communication interface 14 will not acknowledge the data write code block 21 issued by the master controller and will not allow any code of the data write code block 21 to be written into the local Q-bit grayscale command register. For this situation, the master controller should resend the data write code block 21.

The data write transaction structure 20 may further comprise a parity code P of G bits (G-bit parity code P) indicating the correctness of parity of the data write code block 21 and an acknowledge code ACK of H bits (H-bit acknowledge code ACK) indicating whether the smart communication interface 14 acknowledges the data write code block 21, wherein both G and H are positive integers. The G-bit parity code P may have a parity correct state (e.g. logic "1") and a parity wrong state (e.g. logic "0"). Should both the parity and the code length of the data write code block 21 are correct, the master controller issues the parity code P with the parity correct state, else the master controller issues the parity code P with the parity wrong state. In an exemplary embodiment, the smart communication interface 14 may verify the correctness of parity of the data write code block 21 by even parity bit rule. That is to say, the smart communication interface 14 may count the number of occurrences of for instance logic "1" bits (or logic "0" bits in an alternative embodiment) in the data write code block 21, if the number of occurrences of logic "1" bits is even, the parity code P is set to logic "0", if the number of occurrences of logic "1" bits is odd, the parity code P is set to logic "1" to make the whole count of logic "1" bits in the data write code block 21 and the parity code P an even number. Although in the example of FIG. 4, it is illustrated that E=1, G=1 and H=1, this is only for illustration purpose and not intended to be limiting. To provide an example, as shown in FIG. 4, the master controller issues the parity code P at the first type transition edge (e.g. the falling edge) 31 of the clock cycle 33 of the system clock signal S_CLK. When the smart communication interface 14 samples and receives, on the data receive differential pin pair (DT_RCV+, DT_RCV−), the parity code P with the parity correct state at the second type transition edge (e.g. the rising edge) 32 of the clock cycle 33 of the system clock signal S_CLK, it issues the acknowledge code ACK on the data return differential pin pair (DT_RTN+, DT_RTN−) at the first type transition edge (e.g. the falling edge) 34 of the clock cycle 37 which is one clock cycle (e.g. the one clock cycle 35) after the clock cycle 33 during which the parity code P was issued by the master controller. The smart communication interface 14 issues the acknowledge code ACK to inform the master controller that the smart communication interface 14 has acknowledged the data write code block 21.

In an embodiment, the data write transaction structure 20 may further comprise a turnaround code TA of I bits (I-bit turnaround code TA), wherein I is a positive integer. Although in the example of FIG. 4, it is illustrated that I=1, this is only for illustration purpose and not intended to be limiting. The master controller may sample the acknowledge code ACK at the second type transition edge (e.g. the rising edge) 36 of the clock cycle 37 which is one clock cycle (e.g. the one clock cycle 35) after the clock cycle 33 during which the parity code P was issued by the master controller. That is to say, the master controller may sample and receive the acknowledge code ACK at the second type transition edge (e.g. the rising edge) 36 which is immediately following the first type transition edge (e.g. the falling edge) 34 at which the acknowledge code ACK was issued. During the clock cycles (35 and 37) when the turnaround code TA and the acknowledge code ACK are transacted, the master controller may pull the data on the master data driving pin pair (Master_DT+, Master_DT−) (i.e. on the data receive bus pair) to a preset logic state (e.g. logic "1" illustrated as an example in FIG. 4) since the data will be ignored by the smart communication interface 14 anyway.

The master controller may start to drive out each bit of code of the data write transaction structure 20 of a next write data frame at the first type transition edge (e.g. the falling edge) 39 of the clock cycle 38 of the system clock signal S_CLK which is immediately following the clock cycle 37 during which it has received the acknowledge code ACK from the smart communication interface 14 in the current write data frame. That is to say, the master controller may start to drive out each bit of code of the data write transaction structure 20 of a next write data frame at the first type transition edge (e.g. the falling edge) 39 of the system clock signal S_CLK which is immediately following the second type transition edge (e.g. the rising edge) 36 at which the master controller received the acknowledge code ACK in the current write data frame. The smart communication interface 14 may start to write the Q-bit grayscale command code CMD of the current write data frame into the corresponding driving module DRV(c, r) identified by the address code ADD immediately after the parity code P with the parity correct state has been received.

Figure 5:
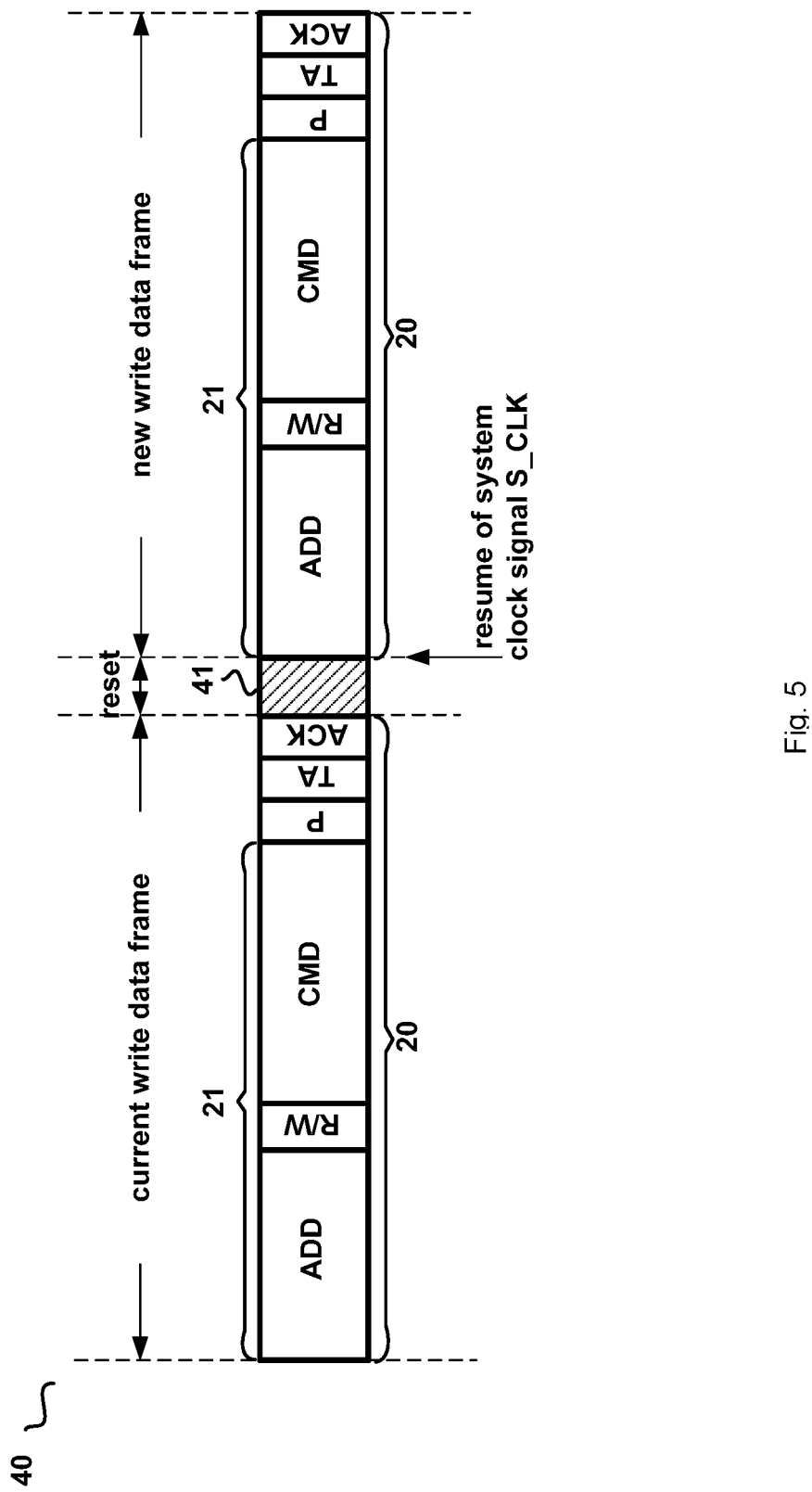
FIG. 5 illustrates another exemplary code transaction timing diagram 40 in write mode in accordance with an embodiment of the present invention.

In accordance with an embodiment of the present invention, as shown in FIG. 5, another exemplary code transaction timing diagram 40 in write mode is illustrated. During the data write transaction communication between the master controller and the smart communication interface 14, if there are scenarios when the master controller would like to reset the communication (e.g. out of synchronization between the bits of code sent by the master controller and the bits of code received by the smart communication interface 14, wrong parity or incorrect code length of the data write code block 21 etc.) in the current write data frame, the master controller may stop the system clock signal S_CLK for a predetermined write-stop duration 41 (e.g. two or more clock cycles of the system clock signal S_CLK). The smart communication interface 14 is accordingly reset too. That is to say, all bits of code of the data write transaction structure 20 are reset. After the predetermined write-stop duration 41, the master controller is configured to resume the driving out of the system clock signal S_CLK, and start to drive out each bit of code of the data write transaction structure 20 of a new write data frame.

Figure 6:
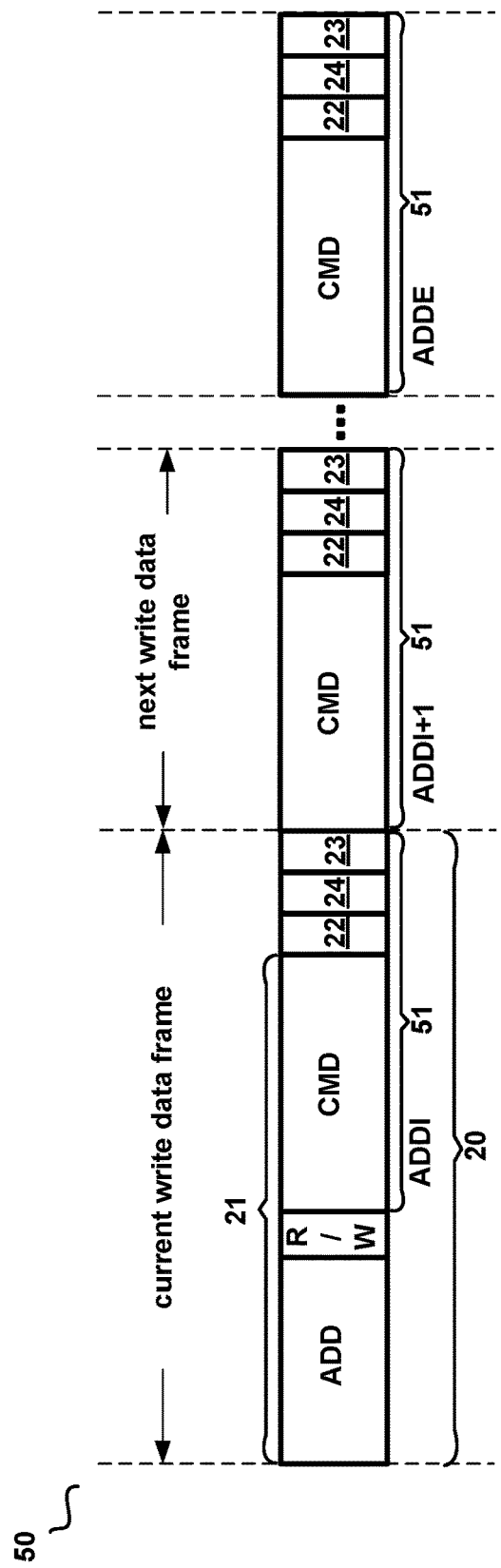
FIG. 6 illustrates another exemplary code transaction timing diagram 50 in write mode in accordance with an embodiment of the present invention.
Figure 7:
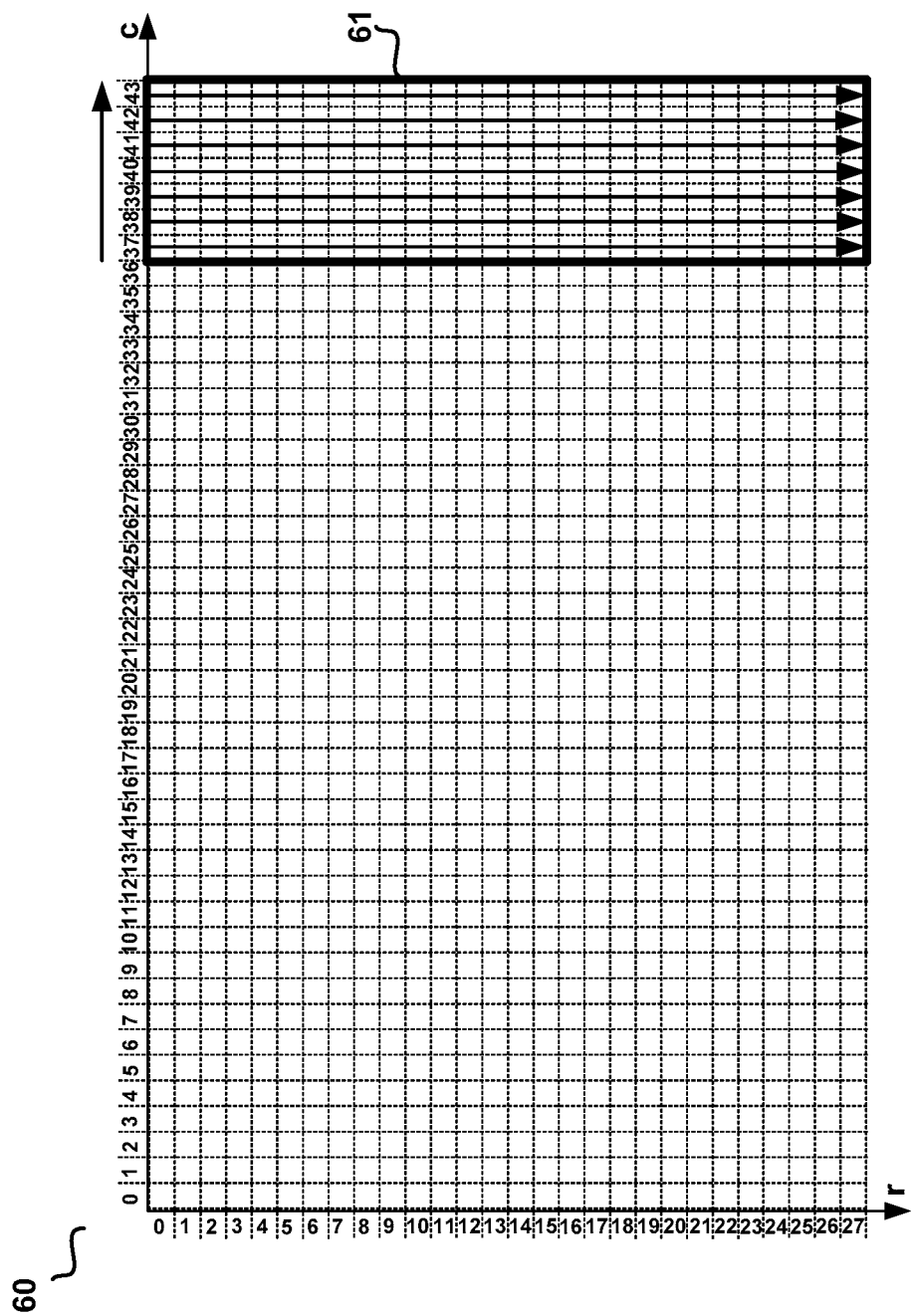
FIG. 7 illustrates a portion of LEDs 61 in portion write mode starting from LED (37, 0) and ending at LED (43, 27) in a LED matrix 60 of 28 rows and 44 columns in accordance with an embodiment of the present invention.

In accordance with an embodiment of the present invention, as shown in FIG. 6, another exemplary code transaction timing diagram 50 in write mode is illustrated. In this example, when the R/W indicating code indicates the smart communication interface 14 is in write mode, the master controller may consecutively drive out the grayscale command code CMD for each one LED of a portion of LEDs having consecutive address codes in the LED matrix, wherein the portion of LEDs starts from a starting LED with an initial address code ADDI and ends with an ending LED with an ending address code ADDE. This may be referred to as a portion write mode. In the current write data frame, the master controller may send the initial address code ADDI identifying the starting LED together with the corresponding grayscale command code CMD for the starting LED, and send the grayscale command code CMD of the next write data frame following the acknowledge code ACK of the current write data frame. In this fashion, the master controller may not need to send the address code ADD for each one of LED of the portion of LEDs together with the grayscale command code CMD. For this situation, the smart communication interface 14 may be configured to increase the address code ADD of the current write data frame by 1 starting from the initial address code ADDI until the ending address code ADDE is reached, and further configured to automatically send the grayscale command code CMD of the next write data frame to the LED identified by the address code ADD of the current data write frame increased by 1. In an embodiment, since the structure of the address code ADD is that the column address code ADDC has higher significance than the row address code ADDR, the row address code ADDR will be increased in the first place, thus the grayscale command code CMD for each one LED of the portion of LEDs are refreshed row by row and then column by column. For instance, as shown in FIG. 7, an embodiment where a LED matrix 60 of 28 rows and 44 columns is illustrated, the portion of LEDs 61 may comprise the LEDs from LED (37, 0) to LED (43, 27) in the LED matrix 60. In this example, the initial address code ADDI= [10010100000], the ending address code ADDE= [10101111011]. The grayscale command code CMD for each one LED of the portion of LEDs 61 from LED (37, 0) to LED (43, 27) may be sent to corresponding driving modules DRV(37, 0) to DRV(43, 27) for the LED(37, 0) to LED(43, 27) consecutively row by row for each column from column 37 to column 43 (the sending order illustrated by arrows in FIG. 7).

Figure 8:
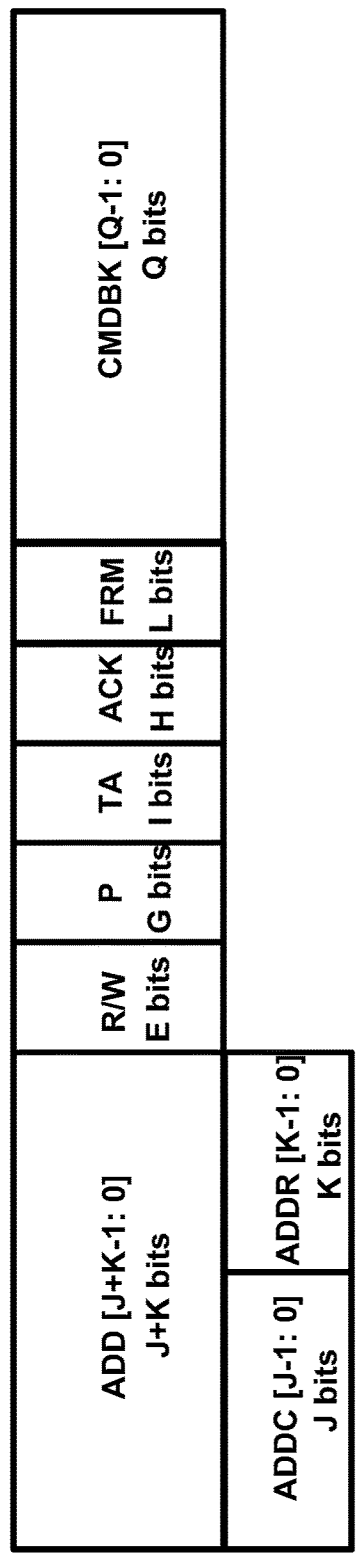
FIG. 8 illustrates an exemplary data read transaction structure 70 of a smart communication interface for the LED matrix driving system 10 when communicating with the master controller in read mode in accordance with an embodiment of the present invention.

In accordance with an embodiment of the present invention, the smart communication interface 14 may have a data read transaction structure 70 when communicating with the master controller in read mode as illustrated in FIG. 8. The data read transaction structure 70 may also comprise the address code ADD and the R/W indicating code, analogous to that of the data write transaction structure. The data read transaction structure 70 may further comprise a grayscale read-back code CMDBK of Q bits (Q-bit grayscale read-back code). The grayscale read-back code CMDBK indicates the grayscale command value for the LED(c, r) identified by the address code ADD.

Figure 9:
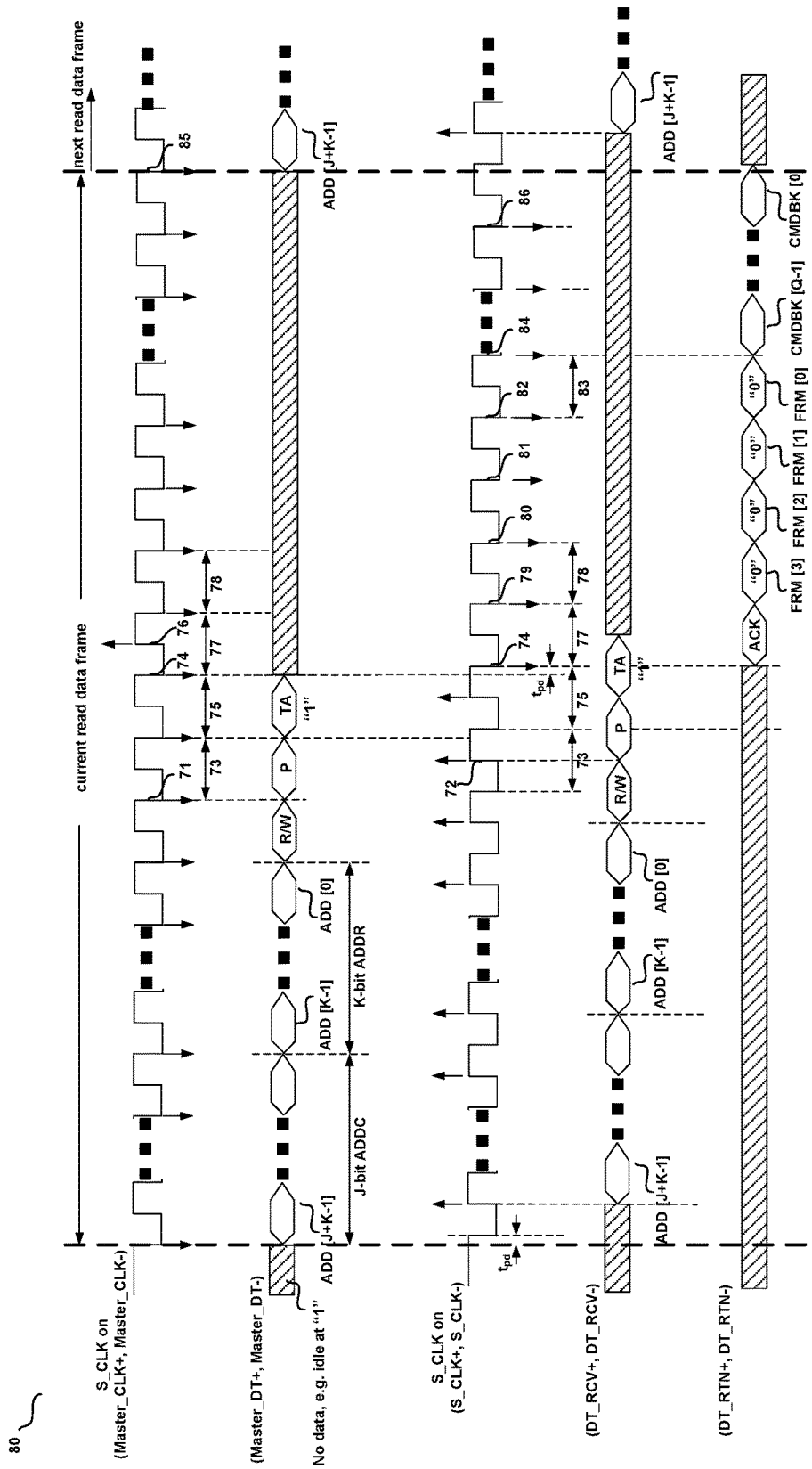
FIG. 9 illustrates an exemplary code transaction timing diagram 80 in read mode in accordance with an embodiment of the present invention.

In accordance with an embodiment of the present invention, as shown in FIG. 9, an exemplary code transaction timing diagram 80 in read mode is illustrated. The master controller may drive out each bit of code of the data read transaction structure 70 on the master data driving pin pair (Master_DT+, Master_DT−) at the first type transition edge (e.g. falling edge) of each clock cycle of the system clock signal S_CLK. The smart communication interface 14 may sample each corresponding bit of code of the data write transaction structure 70 transmitted to the data receive differential pin pair (DT_RCV+, DT_RCV−) at the second type transition edge (e.g. rising edge) of each clock cycle of the system clock signal S_CLK. The smart communication interface 14 may verify the correctness of parity of the address code ADD and the R/W indicating code. If either the parity is wrong or the code length of the address code ADD and the R/W indicating code is incorrect (not (J+K+E) bits), the smart communication interface 14 will not acknowledge the address code ADD issued by the master controller and will not respond to send the grayscale read-back code CMDBK to the master controller.

The data read transaction structure 70 may further comprise a parity code P of G bits (G-bit parity code P) indicating the correctness of parity of the address code ADD and the R/W indicating code R/W. The data read transaction structure 70 may further comprise an acknowledge code ACK of H bits (H-bit acknowledge code ACK) indicating whether the smart communication interface 14 acknowledges the address code ADD. Both G and H are positive integers. The G-bit parity code P may have a parity correct state (e.g. logic "1") and a parity wrong state (e.g. logic "0"). Should both the parity and the code length of the address code ADD and the R/W indicating code R/W are correct, the master controller issues the parity code P with the parity correct state, else the master controller issues the parity code P with the parity wrong state. In an exemplary embodiment, the smart communication interface 14 may verify the correctness of parity of the address code ADD and the R/W indicating code R/W by even parity bit rule. That is to say, the smart communication interface 14 may count the number of occurrences of for instance logic "1" bits (or logic "0" bits in an alternative embodiment) in the address code ADD and the R/W indicating code R/W, if the number of occurrences of logic "1" bits is even, the parity code P is set to logic "0", if the number of occurrences of logic "1" bits is odd, the parity code P is set to logic "1" to make the whole count of logic "1" bits in the address code ADD, the R/W indicating code R/W and the parity code P an even number. Although in the example of FIG. 9, it is illustrated that E=1, G=1 and H=1, this is only for illustration purpose and not intended to be limiting. To provide an example, as shown in FIG. 9, the master controller issues the parity code P at the first type transition edge (e.g. the falling edge) 71 of the clock cycle 73 of the system clock signal S_CLK. When the smart communication interface 14 samples and receives, on the data receive differential pin pair (DT_RCV+, DT_RCV−), the parity code P with the parity correct state at the second type transition edge (e.g. rising edge) 72 of the clock cycle 73 of the system clock signal S_CLK, it issues the acknowledge code ACK on the data return differential pin pair (DT_RTN+, DT_RTN−) at the first type transition edge (e.g. the falling edge) 74 of the clock cycle 77 which is one clock cycle (e.g. the one clock cycle 75) after the clock cycle 73 during which the parity code P was issued by the master controller. The smart communication interface 14 issues the acknowledge code ACK to inform the master controller that the smart communication interface 14 has acknowledged the address code ADD.

In an embodiment, the data read transaction structure 70 may further comprise a turnaround code TA of I bits (I-bit turnaround code TA) immediately following the parity code P, wherein I is a positive integer. Although in the example of FIG. 9, it is illustrated that I=1, this is only for illustration purpose and not intended to be limiting. The master controller may sample and receive the acknowledge code ACK at the second type transition edge (e.g. the rising edge) 76 of the clock cycle 77 which is one clock cycle (e.g. the one clock cycle 75) after the clock cycle 73 during which the parity code P was issued by the master controller. That is to say, the master controller may sample and receive the acknowledge code ACK at the second type transition edge (e.g. the rising edge) 76 which is immediately following the first type transition edge (e.g. the falling edge) 74 at which the acknowledge code ACK was issued. During the clock cycles (75 and 77) when the turnaround code TA and the acknowledge code ACK are transacted, the master controller may pull the data on the master data driving pin pair (Master_DT+, Master_DT−) (i.e. on the data receive bus pair) to a preset logic state (e.g. logic "1" illustrated as an example in FIG. 9) since the data will be ignored by the smart communication interface 14 anyway.

The data read transaction structure 70 may further comprise a frame fill code FRM of L bits (L-bit frame fill code FRM), wherein L is a positive integer, as illustrated in FIG. 8. The frame fill code FRM may be configured to provide a waiting time in the read mode. The waiting time allows proper data transfer from the smart communication interface 14 to the driving module DRV(c, r) identified by the address code ADD. Turning to FIG. 9, the frame fill code FRM is exemplary illustrated as a 4-bit code, i.e. L=4, however this is only for illustration purpose and not intended to be limiting. The smart communication interface 14 starts to issue each bit of the frame fill code FRM on the data return differential pin pair (DT_RTN+, DT_RTN−) at the first type transition edge (e.g. falling edge) of each clock cycle of the system clock signal S_CLK immediately following the clock cycle 77 during which the acknowledge code ACK was issued. For instance, the smart communication interface 14 starts to issue the most significant bit FRM[3] of the 4-bit frame fill code FRM at the falling edge 79 of the system clock signal S_CLK immediately following the clock cycle 77 during which the acknowledge code ACK was issued. And in the following, the smart communication interface 14 successively issues the second most significant bit FRM[2], the third most significant bit FRM[1] and the least significant bit FRM[0] respectively at the falling edges 80, 81 and 82 of each of the following clock cycles of the system clock signal S_CLK.

The smart communication interface 14 starts to issue each bit of the grayscale read-back code CMDBK on the data return differential pin pair (DT_RTN+, DT_RTN−) at the first type transition edge (e.g. falling edge) of each clock cycle of the system clock signal S_CLK immediately following the clock cycle 83 during which the issuance of the frame fill code FRM has been completed. For instance, the smart communication interface 14 starts to issue the most significant bit CMDBK [Q−1] of the Q-bit grayscale read-back code CMDBK at the first type transition edge (e.g. falling edge) 84 of the system clock signal S_CLK immediately following the clock cycle 83 during which the issuance of the frame fill code FRM has been completed. And in the following, the smart communication interface 14 successively issues the remained bits CMDBK [Q−2], . . . , CMDBK [0] of the Q-bit grayscale read-back code CMDBK respectively at the first type transition edge (e.g. falling edge) of each following clock cycle of the system clock signal S_CLK until the last bit (i.e. the least significant bit in this example) CMDBK [0] is issued at the first type transition edge (e.g. falling edge) 86.

Completion of transaction of all bits of code of the data read transaction structure 70 may be referred to as one read data frame. The master controller may start to drive out each bit of code of the data read transaction structure 70 of a next read data frame at the first type transition edge (e.g. the falling edge) 85 of the system clock signal S_CLK which is immediately following the first type transition edge (e.g. the falling edge) 86 at which the smart communication interface 14 has issued the last bit (i.e. the least significant bit in this example) CMDBK[0] of the grayscale read-back code CMDBK in the current read data frame.

Figure 10:
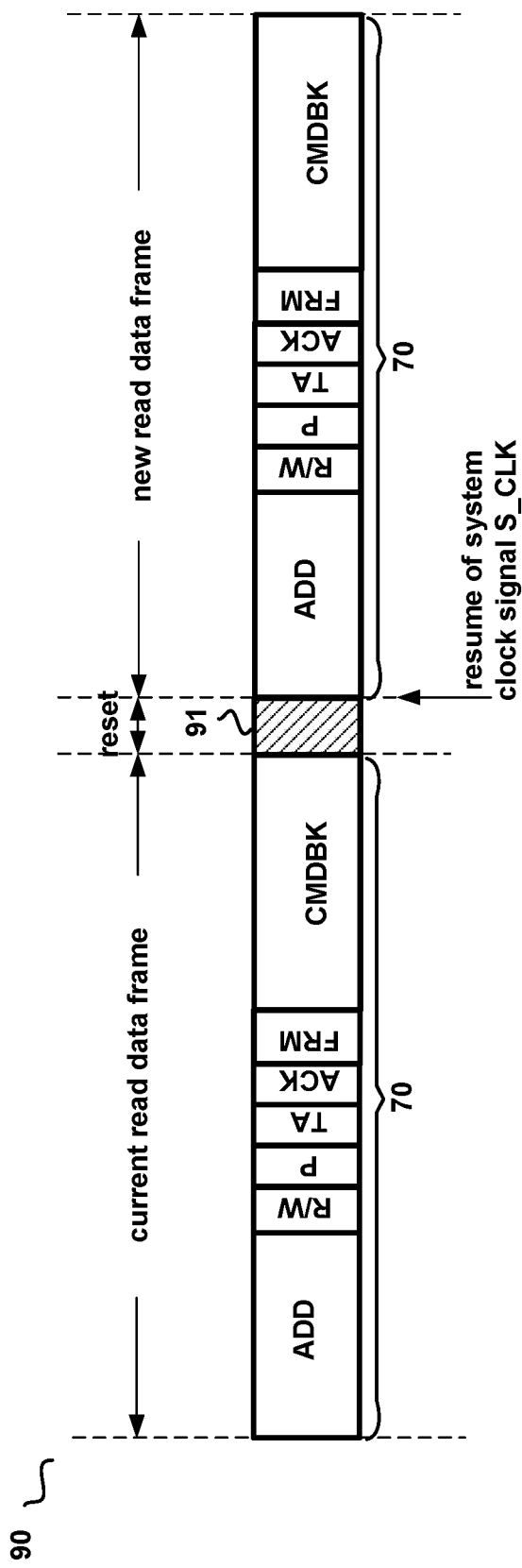
FIG. 10 illustrates another exemplary code transaction timing diagram 90 in read mode in accordance with an embodiment of the present invention.

In accordance with an embodiment of the present invention, as shown in FIG. 10, another exemplary code transaction timing diagram 90 in read mode is illustrated. During the data read transaction communication between the master controller and the smart communication interface 14, if there are scenarios when the master controller would like to reset the communication (e.g. out of synchronization between the bits of code sent by the master controller and the bits of code received by the smart communication interface 14, wrong parity or incorrect code length of the address code ADD and the R/W indicating code R/W etc.) in the current read data frame, the master controller may stop the system clock signal S_CLK for a predetermined read-stop duration 91 (e.g. two or more clock cycles of the system clock signal S_CLK). The smart communication interface 14 is accordingly reset too. That is to say, all bits of code of the data read transaction structure 70 are reset. After the predetermined read-stop duration 91, the master controller is configured to resume the driving out of the system clock signal S_CLK, and start to drive out each bit of code of the data read transaction structure 70 of a new read data frame.

From the foregoing, it will be appreciated that specific embodiments of the present invention have been described herein for purposes of illustration, but that various modifications may be made without deviating from the technology. Many of the elements of one embodiment may be combined with other embodiments in addition to or in lieu of the elements of the other embodiments. Accordingly, the present invention is not limited except as by the appended claims.

What is claimed is:

1. A smart communication interface for a LED driving system driving a LED matrix having a plurality of LEDs, the smart communication interface comprising:
   a data write transaction structure in write mode, wherein the data write transaction structure comprises: an address code for identifying a corresponding one LED among the plurality of LEDs; an R/W indicating code for indicating whether the smart communication interface is in write mode; and a grayscale command code for indicating a programmed grayscale command value for the corresponding one LED identified by the address code;
   a clock differential pin pair configured to receive a system clock signal from a master controller, wherein the system clock signal has a first type transition edge and a second type transition edge opposite to the first type transition edge during each clock cycle; and
   a data receive differential pin pair configured to sample each bit of code of the data write transaction structure at the second type transition edge of each clock cycle, wherein each corresponding bit of code of the data write transaction structure is driven out by the master controller at the first type transition edge of each clock cycle.

2. The smart communication interface of claim 1, wherein the address code, the R/W indicating code and the grayscale command code of the data write transaction structure form a data write code block, and wherein the smart communication interface is configured to verify parity and code length of the data write code block, and is further configured to not acknowledge the data write code block if either the parity is wrong or the code length of the data write code block is incorrect.

3. The smart communication interface of claim 1, wherein the data write transaction structure further comprises:
   a parity code for indicating the correctness of parity of the data write code block; and
   an acknowledge code for indicating whether the smart communication interface acknowledges the data write code block.

4. The smart communication interface of claim 3, wherein the data write transaction structure further comprises a turnaround code immediately following the parity code.

5. The smart communication interface of claim 3 further comprising:
   a clock differential pin pair configured to receive a system clock signal from a master controller, wherein the system clock signal has a first type transition edge and a second type transition edge opposite to the first type transition edge during each clock cycle;
   a data receive differential pin pair configured to sample each bit of code of the data write transaction structure at the second type transition edge of each clock cycle, wherein each corresponding bit of code of the data write transaction structure is driven out by the master controller at the first type transition edge of each clock cycle; and
   a data return differential pin pair configured to issue the acknowledge code at the first type transition edge of a clock cycle of the system clock signal which is one clock cycle after the clock cycle during which the parity code was issued by the master controller.

6. The smart communication interface of claim 5, wherein the master controller is configured to sample the acknowledge code at the second type transition edge of the system clock signal which is immediately following the first type transition edge of the system clock signal at which the acknowledge code was issued.

7. The smart communication interface of claim 5, wherein completion of transaction of all bits of code of the data write transaction structure defines one write data frame; and wherein
   the master controller is configured to start driving out each bit of code of the data write transaction structure of a next write data frame at the first type transition edge of a clock cycle of the system clock signal which is immediately following the clock cycle during which the master controller has received the acknowledge code of the current write data frame.

8. The smart communication interface of claim 5, wherein completion of transaction of all bits of code of the data write transaction structure defines one write data frame; and wherein
   the master controller is configured to stop the system clock signal for a predetermined write-stop duration to reset all bits of code of the data write transaction structure, and is further configured to resume the driving out of the system clock signal and start to drive out each bit of code of the data write transaction structure of a new write data frame after the predetermined write-stop duration.

9. The smart communication interface of claim 5, wherein completion of transaction of all bits of code of the data write transaction structure defines one write data frame; and wherein
   the master controller is configured to consecutively drive out the grayscale command code for each one LED of a portion of LEDs having consecutive address codes in the LED matrix, wherein the portion of LEDs starts from a starting LED with an initial address code and ends with an ending LED with an ending address code; and wherein
   the smart communication interface is configured to increase the address code of the current write data frame by 1 starting from the initial address code until the ending address code is reached, and further configured to automatically send the grayscale command code of the next write data frame to the LED identified by the address code of the current data write frame increased by 1.

10. A smart communication interface for a LED driving system driving a LED matrix having a plurality of LEDs, the smart communication interface comprising:
    a data read transaction structure in read mode, wherein the data read transaction structure comprises: an address code for identifying a corresponding one LED among the plurality of LEDs; an R/W indicating code for indicating whether the smart communication interface is in read mode; and a grayscale read-back code for indicating a grayscale command value for the corresponding one LED identified by the address code;
    a clock differential pin pair configured to receive a system clock signal from a master controller, wherein the system clock signal has a first type transition edge and a second type transition edge opposite to the first type transition edge during each clock cycle; and
    a data receive differential pin pair configured to sample each bit of code of the data read transaction structure at the second type transition edge of each clock cycle, wherein each corresponding bit of code of the data read transaction structure is driven out by the master controller at the first type transition edge of each clock cycle.

11. The smart communication interface of claim 10, wherein the data read transaction structure further comprises:
    a parity code for indicating the correctness of parity of the address code and the R/W indicating code; and
    an acknowledge code for indicating whether the smart communication interface acknowledges the address code.

12. The smart communication interface of claim 11, wherein the data read transaction structure further comprises a turnaround code immediately following the parity code.

13. The smart communication interface of claim 11 further comprising:
    a clock differential pin pair configured to receive a system clock signal from a master controller, wherein the system clock signal has a first type transition edge and a second type transition edge opposite to the first type transition edge during each clock cycle;
    a data receive differential pin pair configured to sample each bit of code of the data read transaction structure at the second type transition edge of each clock cycle, wherein each corresponding bit of code of the data read transaction structure is driven out by the master controller at the first type transition edge of each clock cycle; and a data return differential pin pair configured to issue the acknowledge code at the first type transition edge of a clock cycle of the system clock signal which is one clock cycle after the clock cycle during which the parity code was issued by the master controller.

14. The smart communication interface of claim 13, wherein the master controller is configured to sample the acknowledge code at the second type transition edge of the system clock signal which is immediately following the first type transition edge of the system clock signal at which the acknowledge code was issued.

15. The smart communication interface of claim 13, wherein the data read transaction structure further comprises a frame fill code, and wherein the smart communication interface is configured to start issuing each bit of the frame fill code at the first type transition edge of each clock cycle of the system clock signal immediately following the clock cycle during which the acknowledge code was issued.

16. The smart communication interface of claim 15, wherein the smart communication interface is configured to start issuing each bit of the grayscale read-back code on the data return differential pin pair at the first type transition edge of each clock cycle of the system clock signal which is immediately following the clock cycle during which the issuance of the frame fill code has been completed.

17. The smart communication interface of claim 15, wherein completion of transaction of all bits of code of the data read transaction structure defines one read data frame, and wherein the master controller is configured to start driving out each bit of code of the data read transaction structure of a next read data frame at the first type transition edge of the system clock signal which is immediately following the first type transition edge at which the smart communication interface has issued the last bit of the frame fill code in the current read data frame.

18. The smart communication interface of claim 13, wherein completion of transaction of all bits of code of the data read transaction structure defines one read data frame; and wherein the master controller is configured to stop the system clock signal for a predetermined read-stop duration to reset all bits of code of the data read transaction structure, and is further configured to resume the driving out of the system clock signal and start to drive out each bit of code of the data read transaction structure of a new read data frame after the predetermined read-stop duration.

* * * * *